3,551,173
ZINC POWDER-SILICATE PAINT HAVING
A LONG POT LIFE
Maximilian von Mildenstein, Wolfenbuttel, Germany, assignor to Fahlbert-List G.m.b.H., Wolfenbuttel, Germany
No Drawing. Filed Jan. 19, 1968, Ser. No. 699,063
Claims priority, application Germany, Jan. 21, 1967, F 51,313; Mar. 1, 1967, F 51,682
Int. Cl. C09d 1/04
U.S. Cl. 106—84       5 Claims

ABSTRACT OF THE DISCLOSURE

A zinc-powder silicate paint to which is added a glycol ether such as ethyl, isopropyl or butyl glycol and preferably propyl diglycol in an amount of up to 2% by weight to provide an extended pot life for the paint.

BACKGROUND OF THE INVENTION (1) Field of the invention

The present invention is directed to silicate-zinc-powder paints and an object of the invention is to provide silicate-zinc-powder paints with a long pot life.

(2) Description of the prior art

Conventional silicate-zinc-powder paints usually contain approximately 70-75% zinc powder, and alkaline silicates, water and if applicable, small additions of wetting and suspending agents. The alkaline silicates can be sodium, potassium and lithium silicates in aqueous solution, either alone or in mixture.

A disadvantage of these known paints is their short pot life. By pot life is meant the time within which a paint mixed from its various components can be utilized without difficulty. After lapsing of this time, the paints in their container become granular and finally become solid as a consequence of chemical reactions between the components. For this reason, it has hitherto been necessary to keep the zinc powder and the alkaline silicates separated until the moment of utilization, since after stirring the components together, the paint had a short pot life and remains paintable and sprayable only for a short time. Therefore, it was heretofore necessary to mix the two components together at the site of use, and this has various disadvantages, the most important of which is the fact that the dispersion of the zinc powder, which is of primary importance in the quality of the paint, can never be effected as perfectly at the site, as in a paint factory. Secondly, the success in each case depends upon the degree of care exercised by the users, in combining the two components according to a certain weight or volume ratio. For these reasons, attempts have been made for a long time to produce silicate-zinc-powder paints having a pot or container life considerably exceeding the time spent in shipment and normally on the storage shelf, i.e. a period which must be at least several weeks and preferably several months. In the past, all that has been attained is a container life of several days.

SUMMARY OF THE INVENTION

The objective of the present invention consists in extending the container life of silicate-zinc-powder paints, and thereby avoid difficulties in application and material losses caused by the heretofore short container life.

It has been discovered, that the addition of glycol ethers, especially propyl diglycol will considerably extend the container life of silicate-zinc-powder paints.

The invention contemplates the admixture with silicate-zinc-powder paints of commercial composition, of a glycol ether, especially propyl diglycol. The glycol ethers may be ethers of simple glycols, and also diglycols. Suitable glycol ethers for the purpose according to the invention are, for example, ethyl glycol, isopropyl glycol or butyl glycol. Especially preferred, however, is propyl diglycol (diethylene glycol monopropyl ether).

The glycol ethers are added to the commercial silicate-zinc-powder paints in quantities up to 2% by weight. The preferred dosage is approximately 1% by weight.

The silicate-zinc-powder paints according to the invention generally contain 15-25 weight percent of potassium silicate, 70-75 weight percent of zinc powder, and between 0.2-2 weight percent (preferentially 1% by weight) of glycol ether, preferably propyl diglycol, and water.

By the addition of the glycol ethers to the silicate-zinc-powder paints their container life is multiplied, without adversely affecting the quality of the paint coats produced with these paints. The additive according to the invention, moreover, causes an improved spreadability of the paints and a marked decrease in their tendency to form sediments.

DETAILED DESCRIPTION

The invention will next be described in detail with reference to the following examples.

EXAMPLE 1

A paint composition was formed of the following components:

| | Parts by wt. |
|---|---|
| Potassium silicate, approx. 35 Bé. | 21.5 |
| Water | 7.0 |
| Wetting and suspending agents | 0.1 |
| Powdered zinc | 71.4 |
| Silicate-zinc paint I | 100.0 |

EXAMPLE 2

A paint composition was formed of the following components:

| | Parts by wt. |
|---|---|
| Potassium silicate, approx. 35 Baumé | 21.5 |
| Water | 6.0 |
| Wetting and suspending agents | 0.1 |
| Ethyl, isopropyl or butyl glycol | 1.0 |
| Powdered zinc | 71.4 |
| Silicate-zinc paint II | 100.0 |

EXAMPLE 3

A paint composition was formed by the following components:

| | Parts by wt. |
|---|---|
| Potassium silicate, aprox. 35 Bé. | 21.5 |
| Water | 6.0 |
| Wetting and suspending agents | 0.1 |
| Propyl diglycol | 1.0 |
| Powdered zinc | 71.4 |
| Silicate-zinc paint III | 100.0 |

After mechanical blending and dispersal of the components the paints were introduced into polyethylene containers, sealed in air-tight fashion and stored at room temperature (71½° F.–75° F.).

Their state and consistency were examined daily.

The results were as follows:

Paint I was granular after 3 days, and hard after 5 days.

Paint II became granular after two months and gradually became more and more solid.

Paint III was in perfect state after three months, and after eight months was still usable.

What is claimed is:
1. A silicate-zinc-powder paint composition having a long pot life which consists essentially of a zinc powder, an alkali-silicate, and 0.2–2% by weight of an ether of a mono- or diglycol.
2. A composition as claimed in claim 1 wherein said ether is propyl diglycol.
3. A composition as claimed in claim 1 wherein said ether is selected from the group consisting of ethyl glycol, isopropyl, glycol and butyl glycol.
4. A composition as claimed in claim 2 wherein said propyl diglycol is present in an amount equal to 1% by weight of the composition.
5. A composition as claimed in claim 1 consisting essentially of 70–75% by weight of a zinc powder, 15–25% by weight of potassium silicate and 0.2–2% by weight of a glycol ether selected from the group consisting of ethyl glycol, isopropyl glycol, butyl glycol and propyl diglycol.

References Cited
UNITED STATES PATENTS

| | | | |
|---|---|---|---|
| 3,306,756 | 2/1967 | Miller | 106—84 |
| 3,423,229 | 1/1969 | Kompanek et al. | 106—84 |

JAMES E. POER, Primary Examiner